US007222106B2

(12) United States Patent
Block et al.

(10) Patent No.: US 7,222,106 B2
(45) Date of Patent: May 22, 2007

(54) MECHANISMS FOR HANDLING SOFTWARE LICENSE AGREEMENTS ON MULTI-USER SYSTEM

(75) Inventors: Jeffrey Alan Block, Rochester, MN (US); Bonita Kay Chaney, Mantorville, MN (US); Clair L. Ewert, Rochester, MN (US); Robert Joseph Padzieski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/152,664

(22) Filed: May 21, 2002

(65) Prior Publication Data
US 2003/0220883 A1 Nov. 27, 2003

(51) Int. Cl.
*G06Q 99/00* (2006.01)
*H04K 1/00* (2006.01)
*H04L 9/00* (2006.01)

(52) U.S. Cl. .......................................... 705/59; 705/51
(58) Field of Classification Search .................... 75/59; 707/204; 715/175; 717/176, 170
See application file for complete search history.

(56) References Cited

U.S. PATENT DOCUMENTS

| | | | | |
|---|---|---|---|---|
| 5,671,412 A * | 9/1997 | Christiano | ............... | 707/104.1 |
| 6,108,420 A * | 8/2000 | Larose et al. | .................. | 705/59 |
| 6,131,192 A * | 10/2000 | Henry | ......................... | 717/175 |
| 6,289,452 B1 * | 9/2001 | Arnold et al. | ............... | 713/175 |
| 6,381,742 B2 * | 4/2002 | Forbes et al. | ............... | 717/176 |
| 6,473,771 B1 * | 10/2002 | Zimniewicz et al. | ..... | 707/104.1 |
| 6,493,871 B1 * | 12/2002 | McGuire et al. | ............ | 717/173 |
| 6,698,018 B1 * | 2/2004 | Zimniewicz et al. | ........ | 717/175 |
| 6,744,450 B1 * | 6/2004 | Zimniewicz et al. | ........ | 715/841 |
| 6,757,698 B2 * | 6/2004 | McBride et al. | ............ | 707/204 |
| 6,823,508 B1 * | 11/2004 | Burkhardt et al. | .......... | 717/174 |
| 2001/0029605 A1 * | 10/2001 | Forbes et al. | ................. | 717/11 |
| 2001/0051928 A1 * | 12/2001 | Brody | ......................... | 705/52 |

(Continued)

OTHER PUBLICATIONS http://www.serc.net/report/tr273.pdf—The Eclipse Platform for Tool Integration and Development: Zage et al., Jun. 18, 2006, p. 8, 9 10.*

(Continued)

*Primary Examiner*—Kambiz Abdi
*Assistant Examiner*—Evens Augustin
(74) *Attorney, Agent, or Firm*—Patterson & Sheridan, LLP

(57) ABSTRACT

A method, a data structure, a computer program product and a computer-readable medium for handling license agreements for multiple software packages in a computer system, each software package being identified by a unique package ID and comprising one or more components. One embodiment provides a method comprising: providing a plurality of document files, each document file comprising one or more text elements; providing a plurality of manifest files, each manifest file indicating at least one corresponding document file of the plurality of document files and comprising a unique package ID designating a corresponding software package; extracting a specific unique package ID from a specific software package; determining a corresponding manifest file from the plurality of manifest files on the basis of the extracted unique package ID; determining the at least one corresponding document file of the plurality of document files on the basis of the determined corresponding manifest file; and combining the one or more text elements comprised in the at least one determined corresponding document file to build a license agreement for the specific software package.

42 Claims, 13 Drawing Sheets

U.S. PATENT DOCUMENTS

| | | | |
|---|---|---|---|
| 2002/0019844 A1* | 2/2002 | Kurowski et al. | 709/201 |
| 2002/0059425 A1* | 5/2002 | Belfiore et al. | 709/226 |
| 2002/0124245 A1* | 9/2002 | Maddux et al. | 717/176 |
| 2002/0138226 A1* | 9/2002 | Doane | 702/119 |
| 2003/0023963 A1* | 1/2003 | Birkholz et al. | 717/172 |
| 2003/0143990 A1* | 7/2003 | Minear et al. | 455/418 |

OTHER PUBLICATIONS http://www.dlib.org//dlib/september05/witten/09witten.html—D-Lib magazine, Witten et al., Sep. 5, "A Bridge between Greenstone and DSpace".* http://dev.w3.org/cvsweb/2006/waf/WAPF/WD-WAPF-REQ-20060726.html?rev=1.2#s3_2—Caceres, Jul. 6, Packaging Web Applications Requirements.* http://publibn.boulder.ibm.com/doc_link/.._doc_lib/aixins/aixinsgd/install_bos.htm, "Installation Guide—Installing the Base Operating System", pp. 1-11, May 4, 2001.

http://publibn.boulder.ibm.com/doc_link/...ixins/aixinsgd/install_opt_swupdates.htm, "Installation Guide—Optional Software Products and Sevice Updates", pp. 1-11, May 4, 2001.

http://publibn.boulder.ibm.com/doc_link/.../aixinsgd/bosinst_data_file_examples.htm , "Installation Guide—Appendix C.bosinst.data File Examples", pp. 1-2, May 4, 2001.

http://publibn.boulder.ibm.com/doc_link/en_US/a_doc_lib/cmds/aixcmds3/inulag.htm, "Commands Reference, vol. 3—inulag Command", pp. 1-3, May 4, 2001.

http://publibn.boulder.com/doc_link/en_US/a_doc-lib/cmds/aixcmds3/aixcmds302/htm, Commands Reference, pp. 1-53, May 4, 2001.

* cited by examiner

MECHANISMS FOR HANDLING SOFTWARE LICENSE AGREEMENTS ON MULTI-USER SYSTEM

BACKGROUND OF THE INVENTION

1. Field of the Invention

The present invention generally relates to handling license agreements for software packages in a computer system.

2. Description of the Related Art

Companies are in the business of developing software packages comprising, for example, operating system and application software products, which are then marketed to computer owners. Typically, such software packages are marketed on a fixed fee basis in which a user purchases a copy of the software package, usually under terms of a license agreement. The license agreement normally explains to the user that the software package is owned by a corresponding company and only copyrighted and licensed to the user, but not transferred.

It has been a characteristic of this industry that in order for the developers of the software to recover the often quite large investment in research and development of the software product, and also the costs of manufacture and marketing, that the purchase price of such software items has been relatively high. This high purchase price has been a barrier, in some circumstances, to the widespread licensing of some software and has limited the penetration in some markets. In addition, some users are reluctant to incur such a purchase without first operating the software, since the suitability of software is very difficult to judge without actually using it.

In order to afford users an opportunity to evaluate a particular operating system or application software product, a developer may offer the user a "trial period" during which the user is granted the right to use the operating system or application software product. Upon expiration of the trial period, the user may either license the product or stop using the product.

Growth in the computer industry has also led many personal computer systems manufacturers to "preload" software packages on the systems. The preloaded systems may be marketed as "turn-key" solutions, whereby the user is not required to install the software package(s) and may begin useful operation shortly after turning the system on. In addition, preloaded software packages may be used by a software vendor as a method of introducing the user to a particular software product(s), which the user may purchase upon the expiration of a trial period.

As is well known, a major problem with regard to the preloading of software packages in general is that the end-user is not required to explicitly accept corresponding license agreements, so that legal problems may arise in using these software packages. It is thus possible that a specific software package is preloaded which the end-user is not authorized to use.

Most of today's available software packages only display a license agreement that must be accepted before the installation process is allowed to continue. However, even the mechanisms used on workstations for rendering the license agreements are deficient for installing and managing software packages on multi-user systems. For example, the installation of software may occur off-shift by individuals not qualified to understand or accept the corresponding license agreement. Furthermore, the system language (locale) used to present the license agreement may not be the one understood by the license reviewer, i.e. the end-user. Additionally, the license agreement's acceptance dialogs may disrupt an automated or batch installation processes.

Conventional practice also presents inconveniences when a user installs multiple software packages. In particular, installation of several software packages based on the same software product from one software provider may result in multiple, redundant acceptance dialogs and software that has been preloaded by the system manufacturer, a previous system owner or any other third-party cannot re-request acceptance.

Moreover, license agreements for software packages, which have been accepted by the end-user, cannot easily be found on the computer system in case the end-user wants to read these license agreements again. Additionally, a system administrator of a company cannot control the displaying and requesting for acceptance of license agreements to end-users when, for instance, internally redistributing software.

Consequently, the handling of license agreements for software packages in a computer system is generally cumbersome and inefficient and computer users are not able to manage license agreements of software packages installed, or to be installed, on their computer systems efficiently and effectively.

SUMMARY OF THE INVENTION

The present invention generally relates to handling license agreements for software packages in a computer system.

One aspect of the present invention relates to a method for handling license agreements for a plurality of software packages in a computer system. The method comprises: determining whether at least one license agreement for any one of the plurality of software packages has been declined; and if at least one license agreement has been declined: building the declined license agreement from a plurality of document files; and prompting a user to accept the at least one license agreement.

Another aspect of the present invention relates to a method for handling license agreements for a plurality of software packages in a computer system, the method comprising: providing a single-action option to a user for accepting or declining a single license agreement common to at least two software packages of the plurality of software packages.

Another aspect of the present invention relates to a method for handling license agreements for multiple software packages in a computer system, each software package being identified by a unique package ID and comprising one or more components. The method comprises: providing a plurality of document files, each document file comprising one or more text elements; providing a plurality of manifest files, each manifest file indicating at least one corresponding document file of the plurality of document files and comprising a unique package ID designating a corresponding software package; extracting a specific unique package ID from a specific software package; determining a corresponding manifest file from the plurality of manifest files on the basis of the extracted unique package ID; determining the at least one corresponding document file of the plurality of document files on the basis of the determined corresponding manifest file; and combining the one or more text elements comprised in the at least one determined corresponding document file to build a license agreement for the specific software package.

Another aspect of the present invention relates to a method for handling a license agreement for a selected software package of a plurality of software packages upon installation of the selected software package in a computer system, each software package of the plurality of software packages being identified by a unique package ID and comprising one or more components. The method comprises: providing a plurality of document files, each document file comprising one or more text elements; providing a plurality of manifest files, each manifest file indicating at least one corresponding document file of the plurality of document files and comprising a unique package ID designating one software package of the plurality of software packages; providing a data structure comprising a plurality of package IDs and a plurality of status indications, each status indication being associated with a specific package ID and representing the status of the license agreement for the software package identified by the specific package ID, the status indicating whether the license agreement has been accepted or declined; extracting the unique package ID from the selected software package; determining from the data structure the status of the license agreement for the selected software package identified by the unique package ID; and if the status indicates that the license agreement has been declined: determining a corresponding manifest file from the plurality of manifest files on the basis of the extracted unique package ID; determining the at least one corresponding document file of the plurality of document files on the basis of the determined manifest file; combining the one or more text elements of the at least one determined document file to build the license agreement for the selected software package; displaying the license agreement on a display device of the computer system; prompting a user to accept or decline the license agreement; and in response to the user accepting or declining the license agreement, installing the selected software package only, if the license agreement has been accepted; and if the status indicates that the license agreement has been accepted: installing the selected software package.

Another aspect of the present invention relates to a method for handling license agreements for software packages installed in a computer system when initiating a session with the computer system, each software package being identified by a unique package ID and comprising one or more components. The method comprises: providing a plurality of document files, each document file comprising one or more text elements; providing a plurality of manifest files, each manifest file indicating at least one corresponding document file of the plurality of document files and comprising a unique package ID designating one software package of the plurality of software packages; providing a data structure comprising a plurality of package IDs and a plurality of status indications, each status indication being associated with a specific package ID and representing the status of the license agreement for the software package identified by the specific package ID, the status indicating whether the license agreement has been accepted or declined; extracting the unique package IDs from the software packages installed in the computer system; determining from the data structure the statuses of the license agreements for the software packages identified by the extracted unique package IDs; and for at least one software package, where the status of the license agreement indicates that the corresponding license agreement has been declined: determining the corresponding manifest file from the plurality of manifest files on the basis of the extracted unique package ID of the at least one software package; determining the at least one corresponding document file of the plurality of document files on the basis of the determined corresponding manifest file; combining the one or more text elements of the at least one determined corresponding document file to build the license agreement for the software package; displaying the license agreement on a display device of the computer system; prompting a user to accept or decline the license agreement; and in response to the user accepting or declining the license agreement, enabling the software package, if the license agreement has been accepted, for use by the user; and disabling the software package, if the license agreement has been declined, for use by the user.

Another aspect of the present invention relates to a data structure in a storage medium, for handling license agreements for multiple software packages in a computer system, each software package being identified by a unique package ID and comprising one or more components. The data structure comprises: an indication of at least one document file, the at least one document file comprising one or more text elements to build a license agreement for a corresponding software package; a unique package ID designating the corresponding software package; and an indication of the one or more components comprised in the corresponding software package.

Another aspect of the present invention relates to a computer program product on a signal bearing medium comprising a license agreement manager for handling license agreements for multiple software packages in a computer system, each software package being identified by a unique package ID and comprising one or more components. The license agreement manager comprises a first and a second data structure. The first data structure comprises at least one document file comprising one or more text elements to build a license agreement; and at least one manifest file, the at least one manifest file comprising an indication of at least one document file; a unique package ID designating a corresponding software package; and an indication of the one or more components comprised in the corresponding software package. The second data structure comprises a plurality of package IDs; and a plurality of status indications, each status indication being associated with a specific package ID and representing the status of the license agreement for the software package identified by the specific package ID, the status indicating whether the license agreement has been accepted or declined.

Another aspect of the present invention relates to a computer-readable medium comprising computer-executable instructions for performing an operation for handling license agreements for multiple software packages in a computer system when run in the computer system, each software package being identified by a unique package ID and comprising one or more components, the operation comprising: providing a plurality of document files, each document file comprising one or more text elements; providing a plurality of manifest files, each manifest file indicating at least one corresponding document file of the plurality of document files and comprising a unique package ID designating a corresponding software package; extracting a specific unique package ID from a specific software package; determining a corresponding manifest file from the plurality of manifest files on the basis of the extracted unique package ID; determining the at least one corresponding document file of the plurality of document files on the basis of the determined corresponding manifest file; and combining the one or more text elements comprised in the at least one determined corresponding document file to build a license agreement for the specific software package.

Another aspect of the present invention relates to a computer-readable medium comprising computer-executable instructions for performing, when run on a computer system, an operation for handling a license agreement for a selected software package of a plurality of software packages upon installation of the selected software package in the computer system, each software package of the plurality of software packages being identified by a unique package ID and comprising one or more components, the operation comprising: providing a plurality of document files, each document file comprising one or more text elements; providing a plurality of manifest files, each manifest file indicating at least one corresponding document file of the plurality of document files and comprising a unique package ID designating one software package of the plurality of software packages; providing a data structure comprising a plurality of package IDs and a plurality of status indications, each status indication being associated with a specific package ID and representing the status of the license agreement for the software package identified by the specific package ID, the status indicating whether the license agreement has been accepted or declined; extracting the unique package ID from the selected software package; and determining from the data structure the status of the license agreement for the selected software package identified by the unique package ID. If the status indicates that the license agreement has been declined: determining a corresponding manifest file from the plurality of manifest files on the basis of the extracted unique package ID; determining the at least one corresponding document file of the plurality of document files on the basis of the determined manifest file; combining the one or more text elements of the at least one determined document file to build the license agreement for the selected software package; displaying the license agreement on a display device of the computer system; and prompting a user to accept or decline the license agreement. In response to the user accepting or declining the license agreement, installing the selected software package only, if the license agreement has been accepted. If the status indicates that the license agreement has been accepted, installing the selected software package.

Another aspect of the present invention relates to a computer-readable medium comprising computer-executable instructions for performing, when run on a computer system, an operation for handling license agreements for software packages installed in a computer system when initiating a session with the computer system, each software package being identified by a unique package ID and comprising one or more components, the operation comprising: providing a plurality of document files, each document file comprising one or more text elements; providing a plurality of manifest files, each manifest file indicating at least one corresponding document file of the plurality of document files and comprising a unique package ID designating one software package of the plurality of software packages; providing a data structure comprising a plurality of package IDs and a plurality of status indications, each status indication being associated with a specific package ID and representing the status of the license agreement for the software package identified by the specific package ID, the status indicating whether the license agreement has been accepted or declined; extracting the unique package IDs from the software packages installed in the computer system; and determining from the data structure the statuses of the license agreements for the software packages identified by the extracted unique package IDs. For at least one software package, where the status of the license agreement indicates that the corresponding license agreement has been declined: determining the corresponding manifest file from the plurality of manifest files on the basis of the extracted unique package ID of the at least one software package; determining the at least one corresponding document file of the plurality of document files on the basis of the determined corresponding manifest file; combining the one or more text elements of the at least one determined corresponding document file to build the license agreement for the software package; displaying the license agreement on a display device of the computer system; and prompting a user to accept or decline the license agreement. In response to the user accepting or declining the license agreement, enabling the software package, if the license agreement has been accepted, for use by the user; and disabling the software package, if the license agreement has been declined, for use by the user.

Another aspect of the present invention relates to a computer program product, comprising: (a) a program configured to perform a method for handling license agreements for a software product to be installed on a computer system, the software product comprising one or more packages, the method comprising: (i) determining a license status for the packages in the software product; (ii) identifying software packages having a declined license status; and (iii) prompting the user to accept the identified software packages; (b) a signal bearing media bearing the program.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method, a data structure, a computer program product and a computer for handling license agreements for software packages in a computer system.

In the following description, the term "decline" and all forms derived therefrom are used to designate a non-acceptance of a license agreement. A non-accepted license agreement includes a license agreement, which has been affirmatively rejected by a user when prompted to accept or not accept and further includes a license agreement, which has not yet been accepted.

One embodiment of the invention is implemented as a program product for use with a computer system such as, for example, the computing environment shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
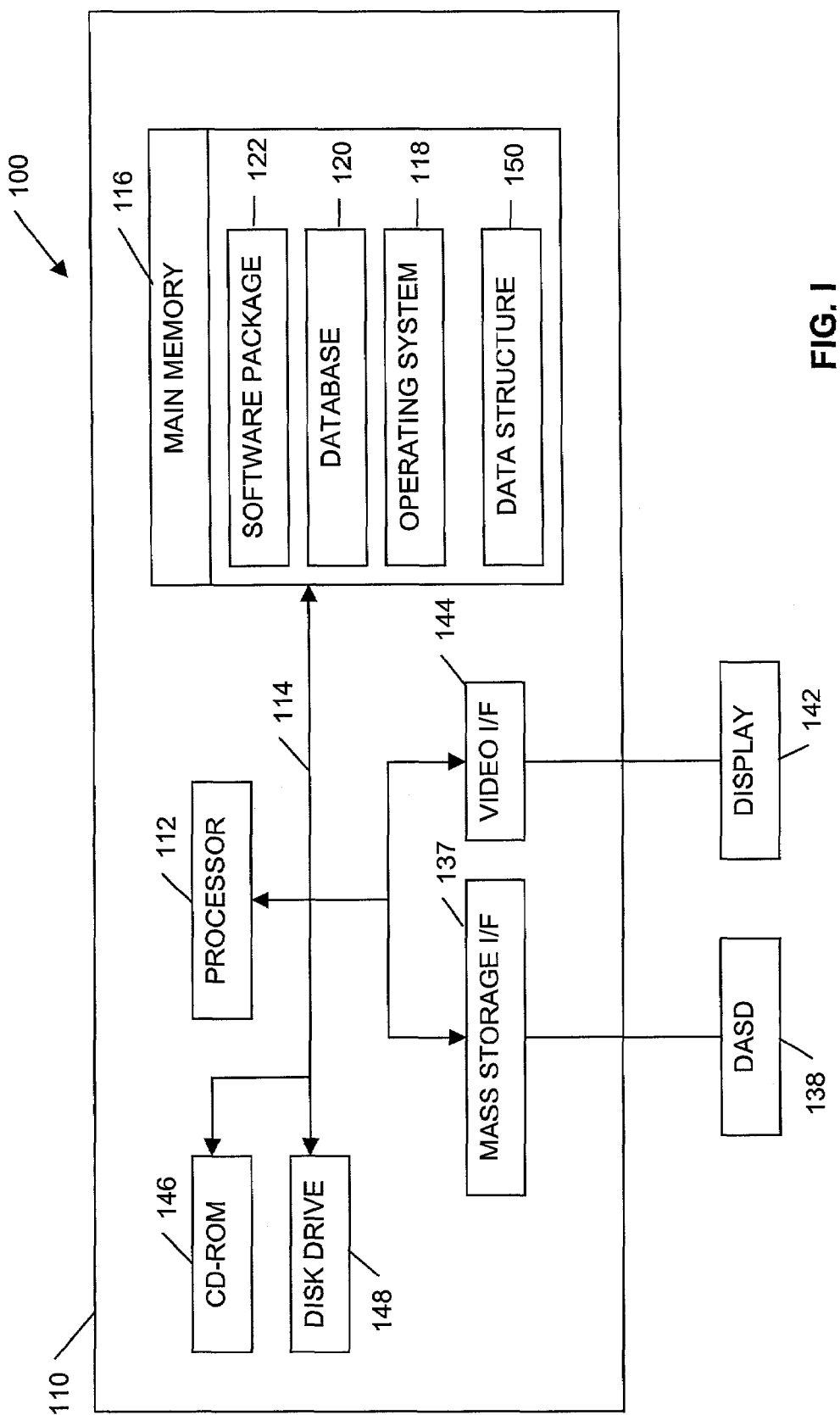
FIG. 1 is a high level diagram of a computing environment according to an aspect of the present invention.

Referring now to FIG. 1, a computing environment 100 comprising an illustrative computer system 110 according to one aspect of the present invention is shown. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, data structure, computer program product and computer-readable mediums of the invention. Illustratively, the computer system 110 is a standalone device; however, in other embodiments, the computer system 110 is part of a networked system. In this regard, the invention may be practiced in a distributed computing environment in which tasks are performed by remote processing devices that are linked through a communications network. In a distributed computing environment, program modules may be located in both local and remote memory storage devices.

In any case, it is understood that FIG. 1 is merely one configuration for a computing environment and computer system. Embodiments of the invention can apply to any comparable configuration, regardless of whether the computer system 110 is a complicated multi-user apparatus, a single-user workstation, or a network appliance that does not have non-volatile storage of its own.

The computer system 110 could include a number of operators and peripheral systems as shown, for example, by a mass storage interface 137 operably connected to a direct access storage device 138, and by a video interface 144 operably connected to a display 142. The display 142 may be any video output device for outputting viewable information. The computer system 110 could further include a number of storage media drives such as a CD-ROM drive 146 and a diskette drive 148 suitable to read out information permanently stored on non-writable storage media (e.g., read-only memory devices within a computer such as CD-ROM disks readable by CD-ROM drive 146) or alterable information stored on writable storage media (e.g., floppy disks readable by diskette drive 148). CD-ROM drive 146 and diskette drive 148 are illustrated as forming an integral part of computer system 110. It should, however, be appreciated, that either CD-ROM drive 146 or diskette drive 148, or both of them, may be provided as peripheral devices that are operably connected to the computer system 110.

Computer system 110 may further comprise any type of suitable input means (not shown) to give input to the computer system 100. For example, a keyboard, keypad, light pen, touch screen, button, mouse, track ball, or speech recognition unit could be used. Further, this input means and display 142 could be combined. For example, a display screen with an integrated touch screen, a display with an integrated keyboard or a speech recognition unit combined with a text speech converter could be used.

Computer system 110 is shown comprising at least one processor 112, which obtains instructions, or operation codes, (also known as opcodes), and data via a bus 114 from a main memory 116. The processor 112 could be any processor adapted to support the methods of the invention. In particular, the computer processor 112 is selected to support the features of the present invention. Illustratively, the processor is a PowerPC processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in computing environment 100, for example, any storage capacity used as virtual memory or stored on a mass storage device (e.g., direct access storage device 138) or on another computer coupled to the computer system 110.

As shown, the main memory 116 includes an operating system 118. The operating system 118 may be any suitable operating system capable of supporting the functions of the present invention. An exemplary operating system, which may be used to advantage, is Linux. The main memory 116 may additionally include databases 120 for storing any type of information. The main memory 116 may further include any type of software packages 122 installed on the computer system 110. As well known in the art, software packages represent computer programs that are delivered to a user in a complete and ready-to-run form, including all necessary utility programs and documentation. Software packages may comprise one or more components of one or more software products including system, utility, and application programs.

The system and utility programs are necessary for operating, controlling and maintaining computer system 110 and may comprise, for instance, performance evaluation tools and communication tools. The application programs may comprise, for instance, text processing and presentation generating tools. The main memory 116 may also include a data structure 150 for handling license agreements for multiple software packages in computer system 110.

Figure 2:
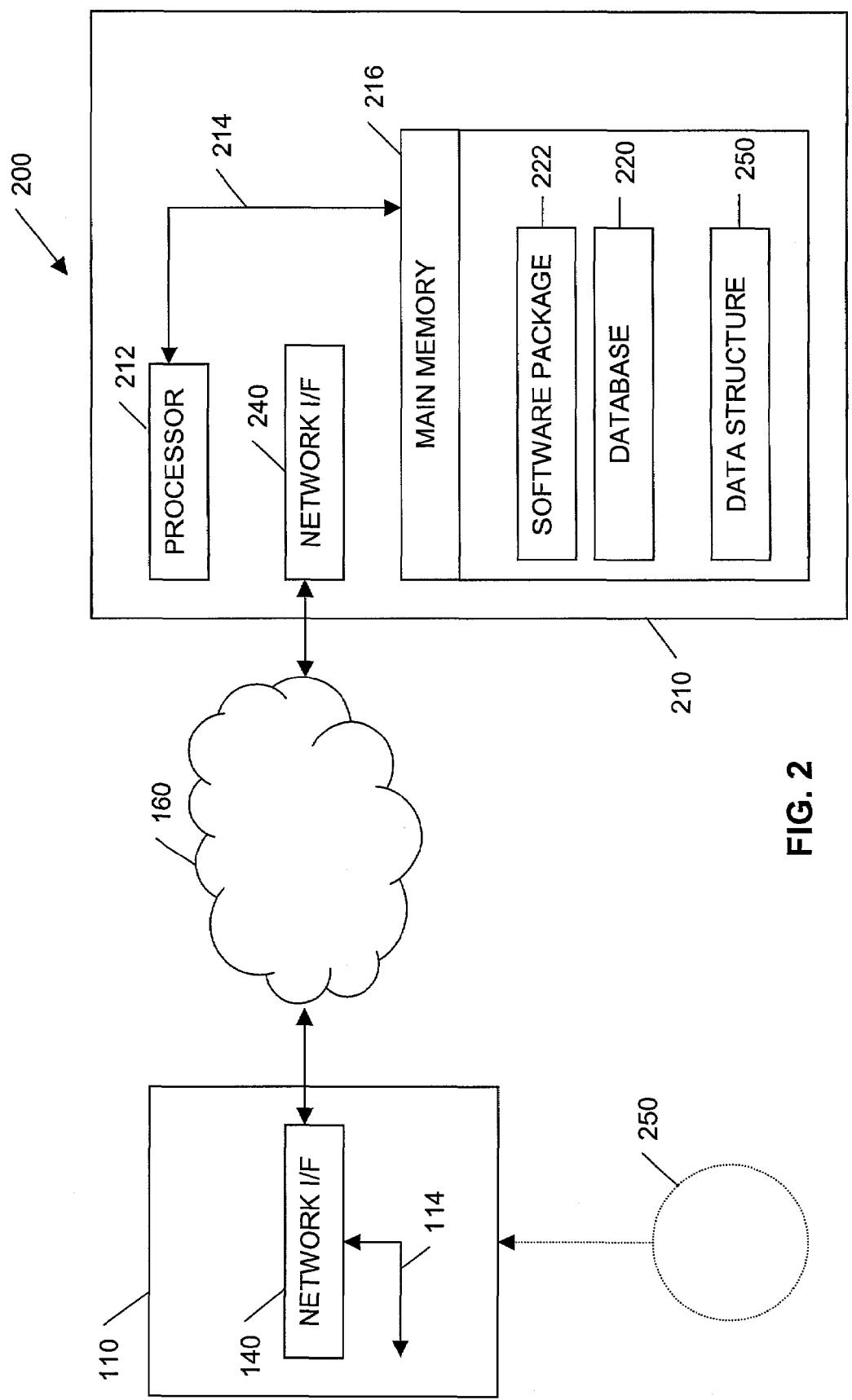
FIG. 2 is a high level diagram of a computing environment according to another aspect of the present invention.

FIG. 2 shows a computing environment 200 comprising computer system 110 of FIG. 1 and a further illustrative computer system 210, both of which are connected to a communications network 160, according to another aspect of the present invention. For the purpose of simplicity, the features of computer system 110, which have been described above with respect to FIG. 1, have been omitted in FIG. 2. It should, however, be appreciated that embodiments of the invention can apply to any comparable configuration of computer system 110, regardless of whether the computer system 110 is a complicated multi-user apparatus, a single-user workstation, or a network appliance that does not have non-volatile storage of its own. Furthermore, only one further computer system 210 has been illustrated in FIG. 2. However, it should be clear that more than one computer system may be connected to the communications network 160.

According to FIG. 2, the computer system 110 further comprises the network interface 140 operably connected to data bus 114 (as shown in FIG. 1). Network interface 140 is suitable to establish a network connection between computer system 110 and computer system 210 via communications network 160, preferably via the Internet.

Computer system 210 preferably comprises a processor 212 operably connected to a network interface 240 and a main memory 216 via data bus 214. The network interface 240 is suitable to establish the communication with computer system 110 via communications network 160.

The main memory 216 is any memory sufficiently large to hold the necessary programs and data structures. Main memory 216 could be one or a combination of memory devices, including Random Access Memory, nonvolatile or backup memory, (e.g., programmable or Flash memories, read-only memories, etc.). In addition, memory 216 may be considered to include memory physically located elsewhere in computing environment 200, for example, any storage capacity used as virtual memory or stored on a mass storage device (not shown) or on another computer coupled to the computer system 210.

As shown, the main memory 216 preferably includes any type of software packages 222 which may be downloaded over the communications network 160. Software packages 222 may comprise one or more components of one or more software products including system, utility, and application programs. The software products may comprise any type of software, such as office automation software comprising any tools for enabling a user to integrate traditional office activities, including processing text, generating presentations, sending and receiving messages and conferencing; games; Internet related applications; as well as software updates. The main memory 216 may additionally include databases 220 for storing any type of information, such as documentation associated with the software packages 222. The main memory 216 may also include a data structure 250 for handling license agreements for multiple software packages in computer system 110.

It should be appreciated that data structure 250 may be stored in any type of signal bearing media as described above, for instance, on a removable disk, as e.g. indicated in dotted lines in FIG. 2 for purposes of illustration.

Figure 3:
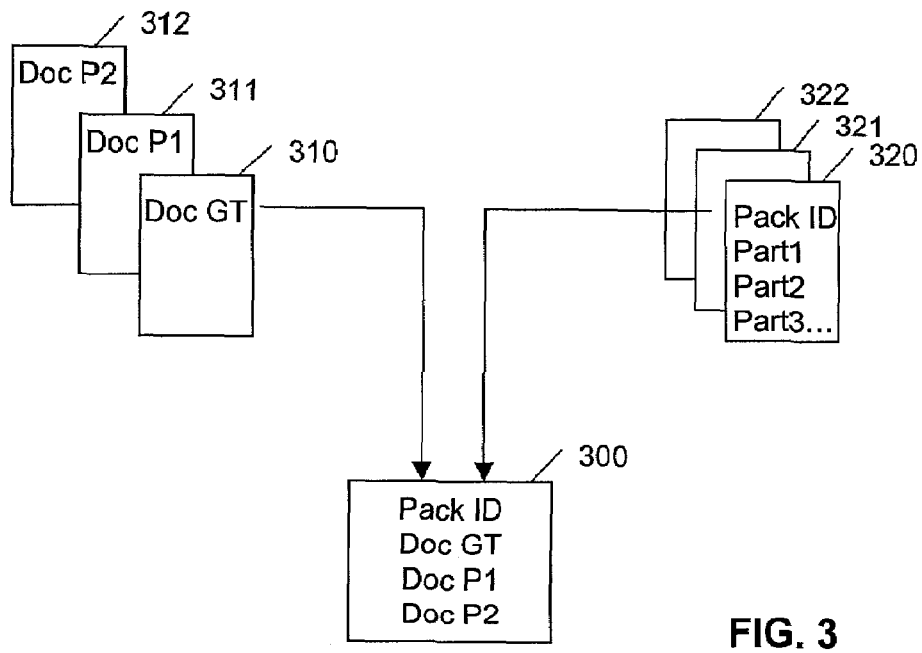
FIG. 3 is a block diagram of a data structure according to one aspect of the present invention.

FIG. 3 shows a data structure 300, which is an embodiment of data structure 150 and 250 shown in FIG. 1 and FIG. 2, respectively. Data structure 300 may be one embodiment of a manifest file suitable for handling license agreements for multiple software packages 320, 321, 322 (which are representations of software packages 122 and 222 shown I FIG. 1 and FIG. 2, respectively) in a computer system as described above with respect to FIGS. 1 and 2. Each software package 320, 321, 322 is preferably identified by a unique package ID and comprises one or more components. For instance, software package 320 is uniquely identified by package ID "PackID" and comprises components Part1, Part2, Part3 etc. Furthermore, a plurality of document files 310, 311, 312 is provided. Each document file is uniquely named, for example by the software provider, and comprises one ore more text elements (e.g. in text or ASCII format). In the exemplary illustration of FIG. 3, document files 310, 311, 312 are uniquely named DocGT, DocP1 and DocP2. A combination of the one or more text elements of the one or more document files 310, 311, 312 is used to build a license agreement for a specific software package. In one embodiment, the indication DocGT, DocP1, DocP2 of any one of document files 310, 311, 312 may comprise, for example, (i) a path pointing to a corresponding file stored in a local storage device, for instance, the main memory 116 of computer system 110 in FIG. 1; (ii) a path pointing to a corresponding file stored in a removable storage medium; or (iii) a link pointing to a corresponding file stored in a storage device of a remote computer system, for instance, the main memory 216 of computer system 210 of FIG. 2.

Figure 4:
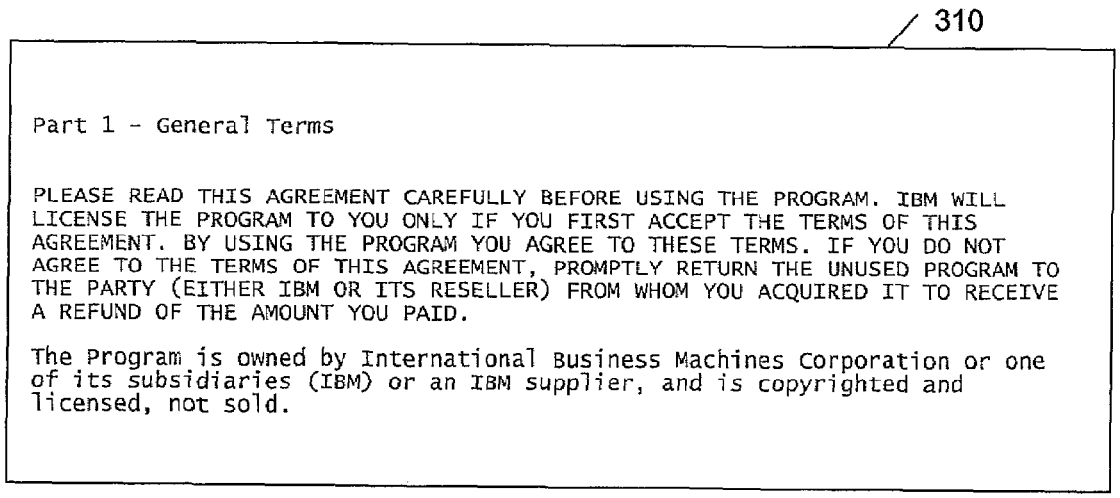
FIG. 4 is an illustration of an exemplary document file according to the present invention.

FIG. 4 is an illustration of the document file 310 of FIG. 3, which is named DocGT as an abbreviation of "Document General Terms". Accordingly, document file 310 comprises a text element that represents an introductory portion related to general terms of a license agreement of a software package owned by International Business Machines Corporation of Armonk, N.Y.

Figure 5:
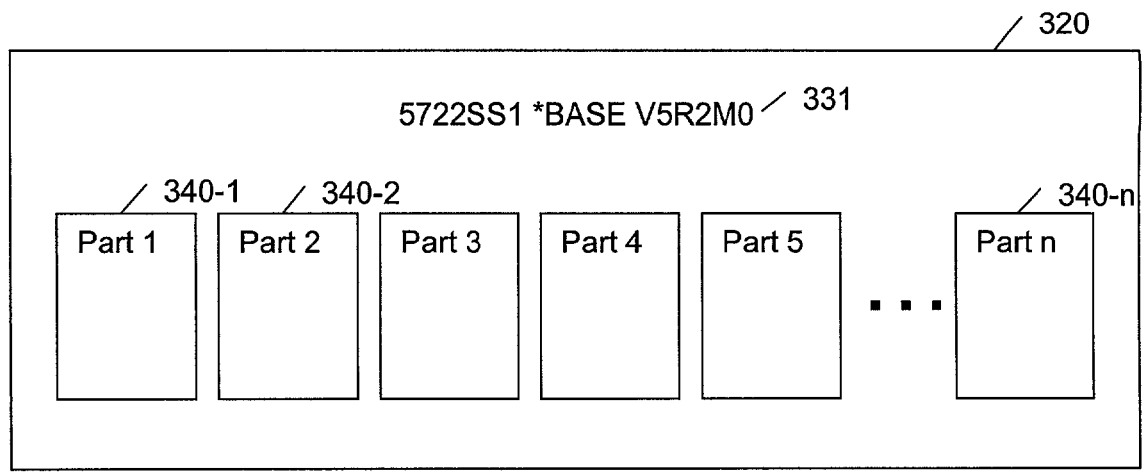
FIG. 5 is an illustration of an exemplary software package according to the present invention.

FIG. 5 is an illustration of software package 320 of FIG. 3. Software package 320 is uniquely identified by package ID 331, which is represented by way of example as "5722SS1 *Base V5R2M0", and comprises components 340-1, 340-2, . . . , 340-n, which are designated as Part1, Part2, . . . , Partn by way of example.

The exemplary package ID 331 comprises a first part "5722SS1", which preferably identifies a corresponding software product, for example the operating system OS/400 of International Business Machines Corporation of Armonk, N.Y. A second part "*Base" indicates a selected option of the software product and, thus, indicates one or more components required to build software package 320. In this case, "*Base" refers to the basic installation of the operating system. A third part "V5R2M0" indicates preferably a version associated with the selected software package, as for instance, version 5, release 2 etc.

Components 340-1–340-n are components of one or more software products including system, utility, and application programs and represent all modules necessary to build the corresponding software package 320.

Figure 6:
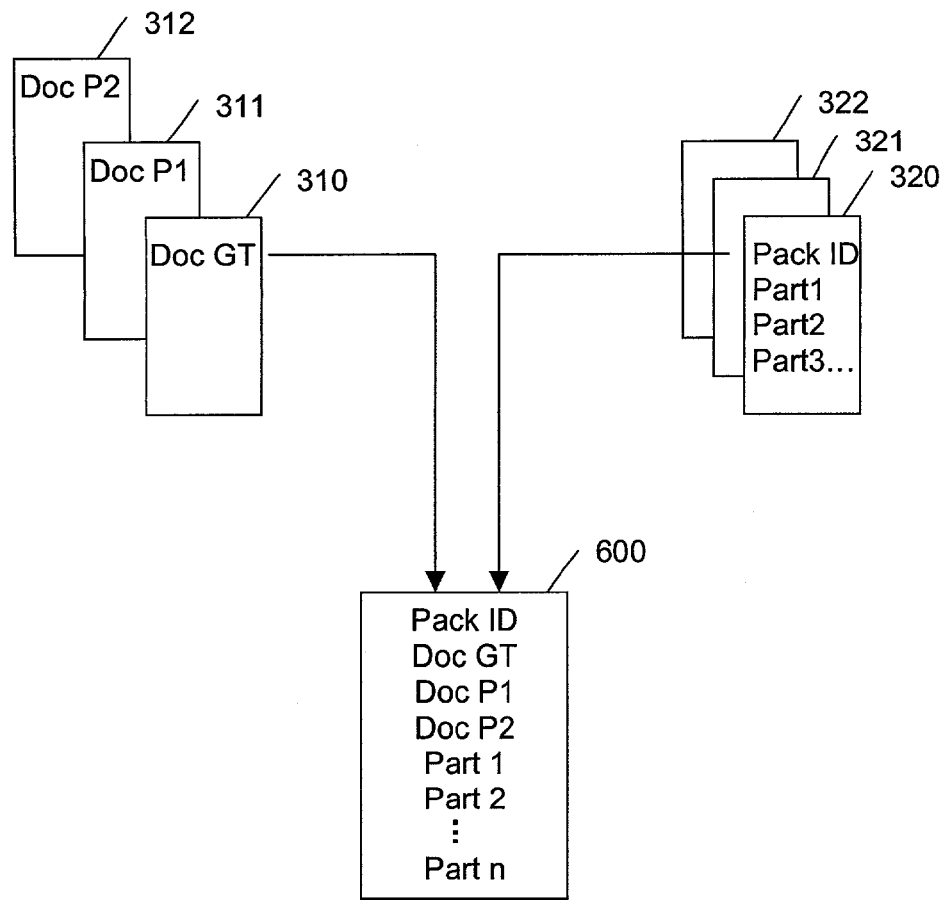
FIG. 6 is a block diagram of a data structure according to another aspect of the present invention.

FIG. 6 is a data structure 600, which is an embodiment of data structure 150 and 250 shown in FIG. 1 and FIG. 2, respectively. Data structure 600 may represent a manifest file according to another aspect of the present invention. As such, data structure 600 may represent an alternative embodiment of the data structure 300 shown in FIG. 3. Therefore, like reference numerals used in FIGS. 3 and 6 designate like elements. A detailed description of these elements will therefore be omitted for the purpose of conciseness.

In addition to the aspects described with reference to FIG. 3, data structure 600 comprises indications Part1, Part2, ..., Partn pointing to parts 340-1, 340-2, ..., 340-n of software package 320 as shown in FIG. 5, and could also be provided as a manifest file in Text- or ASCII-format. Data structure 600 may also be used to build a manifest file on the basis of the elements comprised therein.

Figure 7:
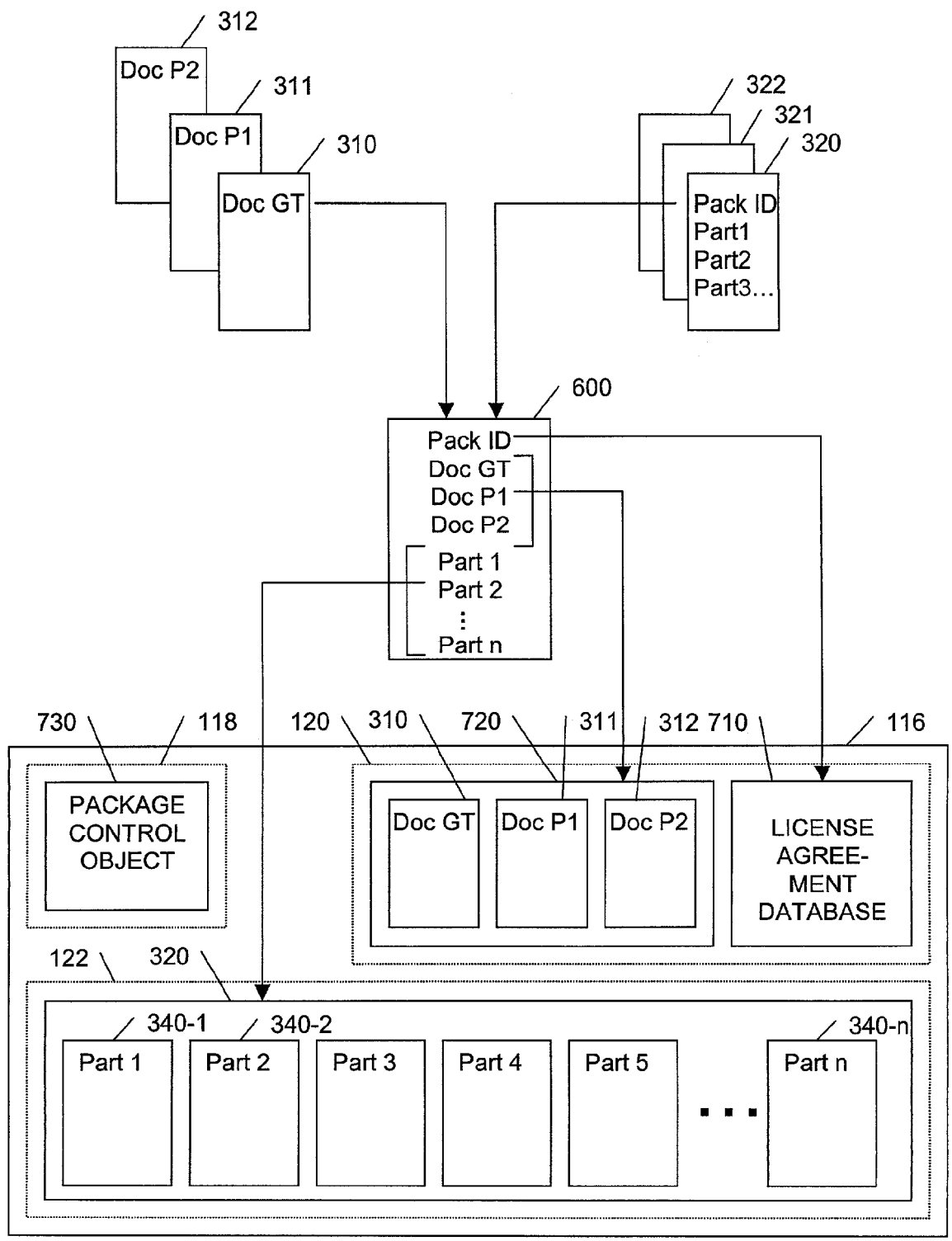
FIG. 7 is a block diagram of a license agreement manager according to another aspect of the present invention.

FIG. 7 is a block diagram of a license agreement manager 700 according to another aspect of the present invention. With respect to FIG. 6, like reference numerals designate like elements. A detailed description of these elements will therefore be omitted for the purpose of conciseness.

According to this aspect of the present invention, data structure 600, document files 310, 311, 312 and components 340-1, 340-2, ..., 340-n of software package 320 are stored in one removable storage disk, such as a floppy disk, a CD-ROM or a DVD. This removable storage disk may thus be distributed as such and can be used to install software package 320 on computer system 110 of FIG. 1.

To this end, components 340-1, 340-2, ..., 340-n of software package 320 are retrieved from the removable storage medium and stored within part 122 of the main memory 116 of computer system 110 of FIG. 1, which is associated with software packages. Document files 310, 311, 312 are retrieved from the removable storage medium and stored within a document repository 720 in part 120 in the main memory 116 of computer system 110 of FIG. 1, which is associated with databases. Within part 120, a further data structure 710 may be stored representing a license agreement database. Data structure 710 preferably comprises a plurality of package IDs and a plurality of status indications, each status indication being associated with a specific package ID and representing the status of the license agreement for the software package identified by the specific package ID, the status indicating whether the license agreement has been accepted or declined. Accordingly, package ID PackID may be stored within data structure 710. Optionally, a package control object 730 can be created as part of operating system 118 and stored in the main memory 116 of computer system 110 of FIG. 1.

It should be understood that the above should be considered as an exemplary embodiment of a license agreement manager according to the present invention. However, a person skilled in the art would immediately recognize that alternative embodiments are possible. For instance, document files 310, 311, 312 need not be stored in the main memory of the computer system and may be retrieved at any time from the removable storage medium. Furthermore, document files 310, 311, 312 may be retrieved from the Internet or any other suitable communications network. Alternatively, document files 310, 311, 312 may be pre-stored in a storage device of the computer system 110 of FIG. 1. Additionally, components 340-1, 340-2, ..., 340-n of software package 320 may also be retrieved and downloaded via the Internet or any other suitable communications network. Therefore, the above exemplary description of the license agreement manager according to FIG. 7 is not intended to limit the present invention to the above disclosed embodiment, but should instead be understood in the broadest sense according to the state of the art.

The functions and use of the above described data structures and license agreement manager will be explained in more detail in the following with respect to FIGS. 8–19.

Figure 8:
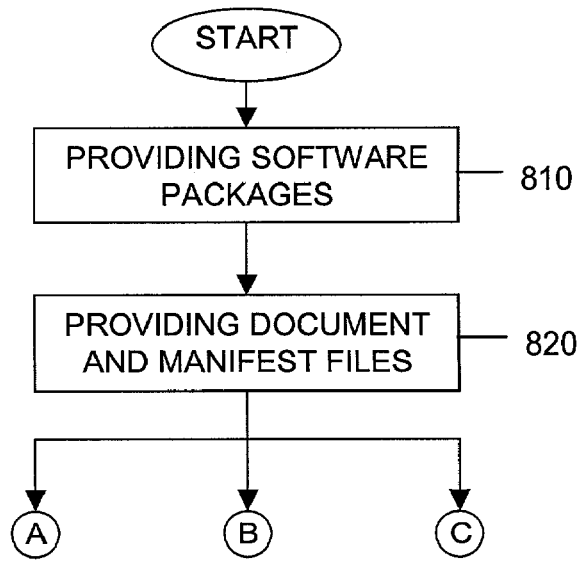
FIGS. 8–13 are flowcharts of methods for handling license agreements according to different aspects of the present invention.

FIGS. 8–13 are flowcharts of methods for handling license agreements in a computer system as described above with respect to FIGS. 1 and 2 according to different aspects of the present invention. FIG. 8 shows initial steps to any of the methods as described below with respect to FIGS. 9–13. In view of the above detailed description and the common knowledge of those skilled in the art, details concerning providing, storing, retrieving, downloading, displaying, distributing, etc., of files, data structures, software packages and so on, will be omitted in the following. However, it should be understood that any one of the above described features and system components may be employed in any possible combinations thereof to carry out the below described steps of the inventive methods.

Step 810 comprises of providing at least one software package, the at least one software package being identified by a unique package ID and comprising one or more components. Step 820 comprises of providing a plurality of document files, each document file comprising one or more text elements; and providing at least one manifest file, the at least one manifest file indicating at least one corresponding document file of the plurality of document files and comprising a unique package ID designating a corresponding software package.

Steps 810 and 820 may be combined in one step, e.g., when providing corresponding components of a software package, a respective manifest file in form of a data structure as described above with respect to FIG. 6 and a plurality of document files on one removable storage medium. Alternatively, the steps of providing a plurality of document files and providing at least one manifest file may be performed separately.

From step 820, processing may proceed according to a variety of embodiments. By way of illustration, three embodiments for handling license agreements in a computer system, designated as A, B and C, will be described.

Figure 9:
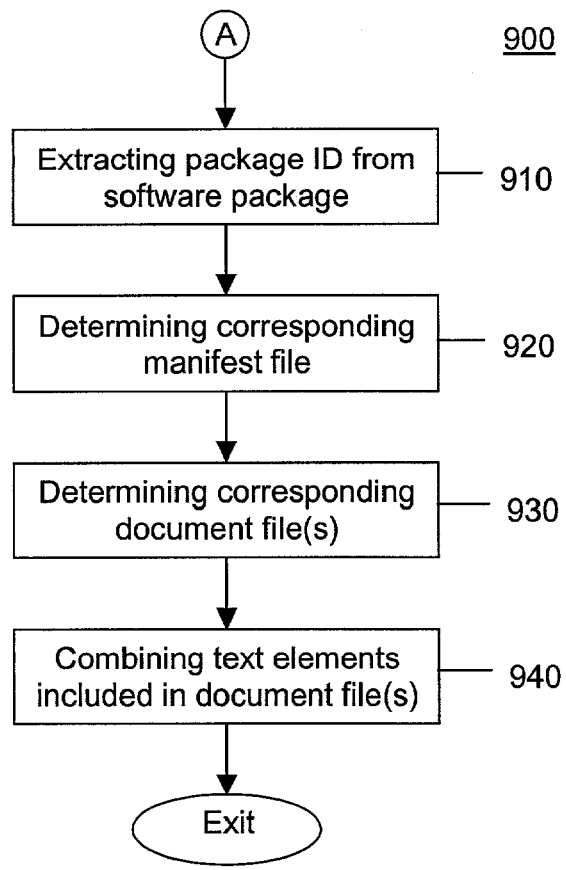

FIG. 9 illustrates aspect A in more detail and relates to a method 900 for handling license agreements for multiple software packages in a computer system, each software package being identified by a unique package ID and comprising one or more components. In step 910, a specific unique package ID is extracted from a specific software package. This specific unique package ID is used in step 920 to determine a corresponding manifest file from a plurality of manifest files. The determined corresponding manifest file is used in step 930 to determine the at least one corresponding document file of the plurality of document files. The one or more text elements of the at least one determined corresponding document file are used in step 940 to build a license agreement for the specific software package.

The unique package ID may further be extracted upon installation of the specific software package. In one embodiment, the license agreement for the specific software package is displayed on a display device of the computer system. Alternatively or additionally, the license agreement may be printed on a suitable printing device. Furthermore, the license agreement may be displayed within a graphical user interface comprising a prompt for a user to accept or decline the license agreement. The user's answer may be stored in a data structure in a storage device of the computer system to indicate, whether the license agreement for the specific software package has been accepted or declined.

Figure 10:
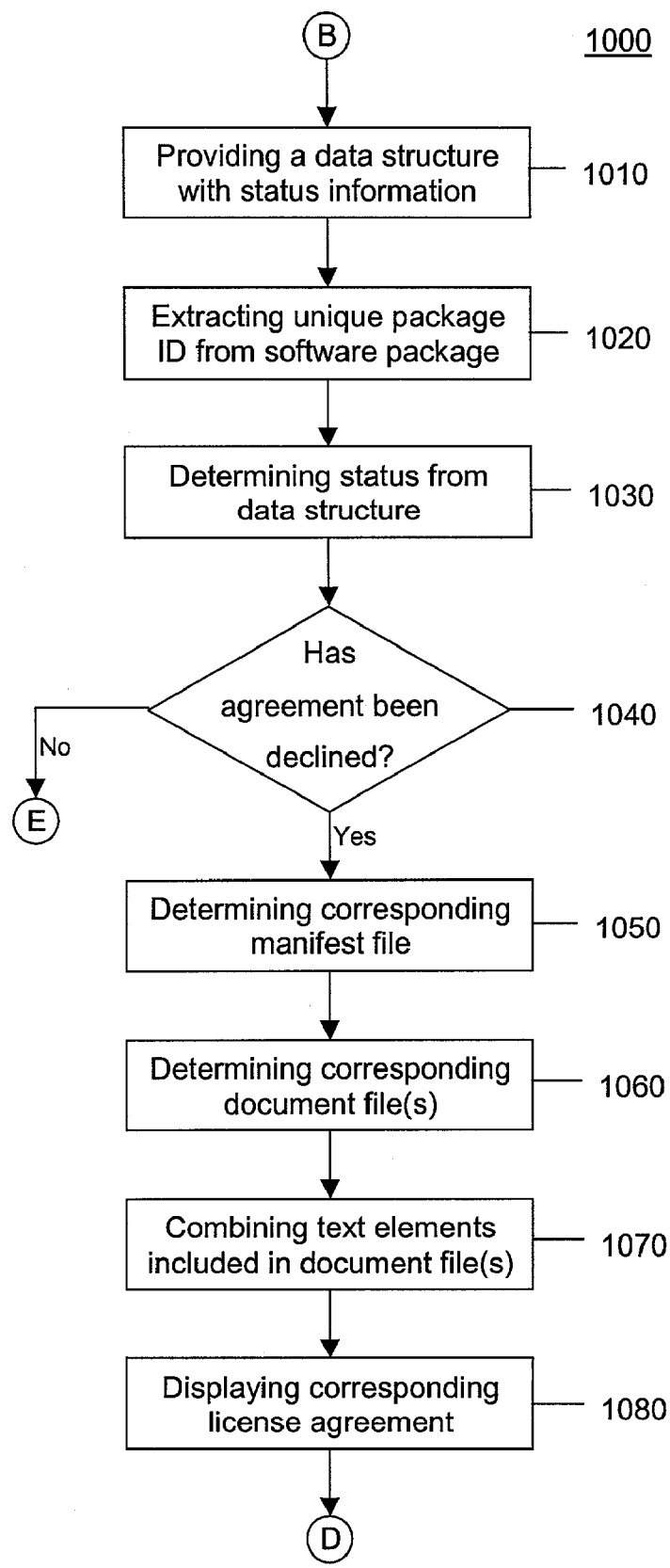
Figure 11:
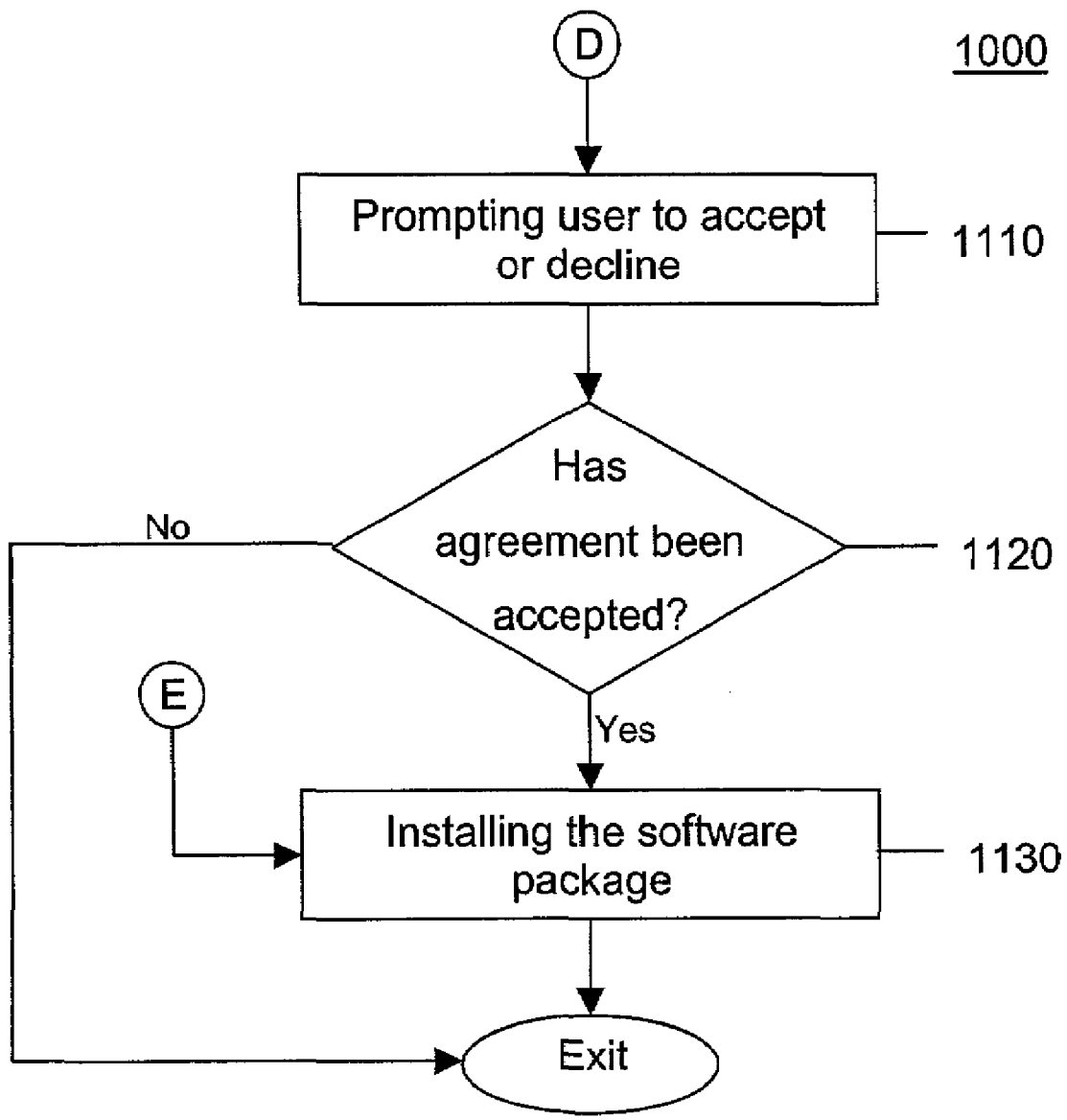

FIGS. 10 and 11 will be described in the following. FIGS. 10 and 11 illustrate aspect B in more detail and relate to a method 1000 for handling a license agreement for a selected software package of a plurality of software packages upon installation of the selected software package in a computer system. Each software package of the plurality of software packages is identified by a unique package ID and comprises one or more components. In one embodiment, a determination is made when launching a setup routine for installation of the software package in order to determine whether the software package to be installed, a previous version of the software to be installed or components thereof are already installed on the computer system. If the determination is answered in the affirmative, a respective indication can be made to a user requesting an appropriate action. Thus, the user may be requested to indicate whether the installation should be executed in case the software to be installed, a previous version or components of the software package is already installed on the computer system. Alternatively, the installation may automatically be (i) cancelled, if the software package is already installed on the computer system, or (ii) executed, if the software package is not already installed on the computer system.

In step 1010, a data structure comprising a plurality of package IDs and a plurality of status indications is provided. Each status indication is associated with a specific package ID and represents the status of the license agreement for the software package identified by the specific package ID. The status indicates whether the license agreement has been accepted or declined. In step 1020, the unique package ID is extracted from the selected software package; and in step 1030, the status of the license agreement for the selected software package identified by the unique package ID is determined from the data structure.

In step 1040, a determination is made on whether the status of the license agreement for the selected software package identified by the unique package ID indicates that the license agreement has been accepted or declined. If the status indicates that the license agreement has been accepted, the process continues in step 1130 as shown in FIG. 11, which will be described below. If the status indicates that the license agreement has been declined, the process continues in step 1050.

In step 1050, a corresponding manifest file is determined from the plurality of manifest files on the basis of the extracted unique package ID. In step 1060, the at least one corresponding document file is determined from the plurality of document files on the basis of the determined corresponding manifest file. The one or more text elements of the at least one determined document file are combined in step 1070 to build the license agreement for the selected software package.

In step 1080, the license agreement is displayed on a display device (e.g. display 142 shown in FIG. 1) of the computer system. In step 1110, the user is prompted to accept or decline the license agreement. In step 1120, the user's response is evaluated to determine whether the license agreement was accepted or declined.

In response to the user accepting or declining the license agreement, an appropriate action is taken. If the license agreement has been accepted, the process continues in step 1130. In step 1130, the selected software package is installed. If the license agreement has been declined, the process finishes and the installation procedure preferably stops.

In the method 1000 of FIGS. 10 and 11, the at least one determined corresponding document file is preferably retrieved from a plurality of document files stored in a storage device of a remote computer system (e.g. computer system 210 shown in FIG. 2). The storage device of the remote computer system is accessed via a communications network, e.g., the Internet; and the at least one determined corresponding document file of the plurality of document files is downloaded via the communications network.

Furthermore, the data structure may indicate a plurality of available software packages for at least one software product, the selected software package being one of the plurality of available software packages.

Figure 12:
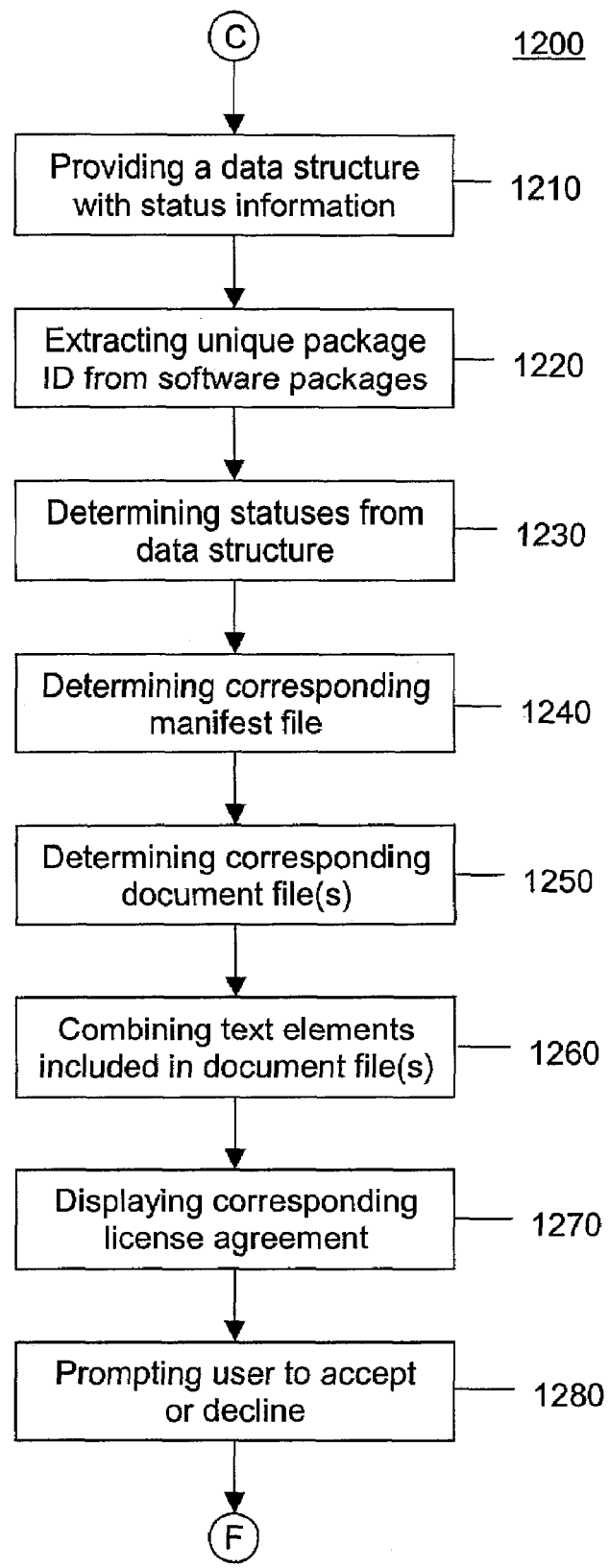
Figure 13:
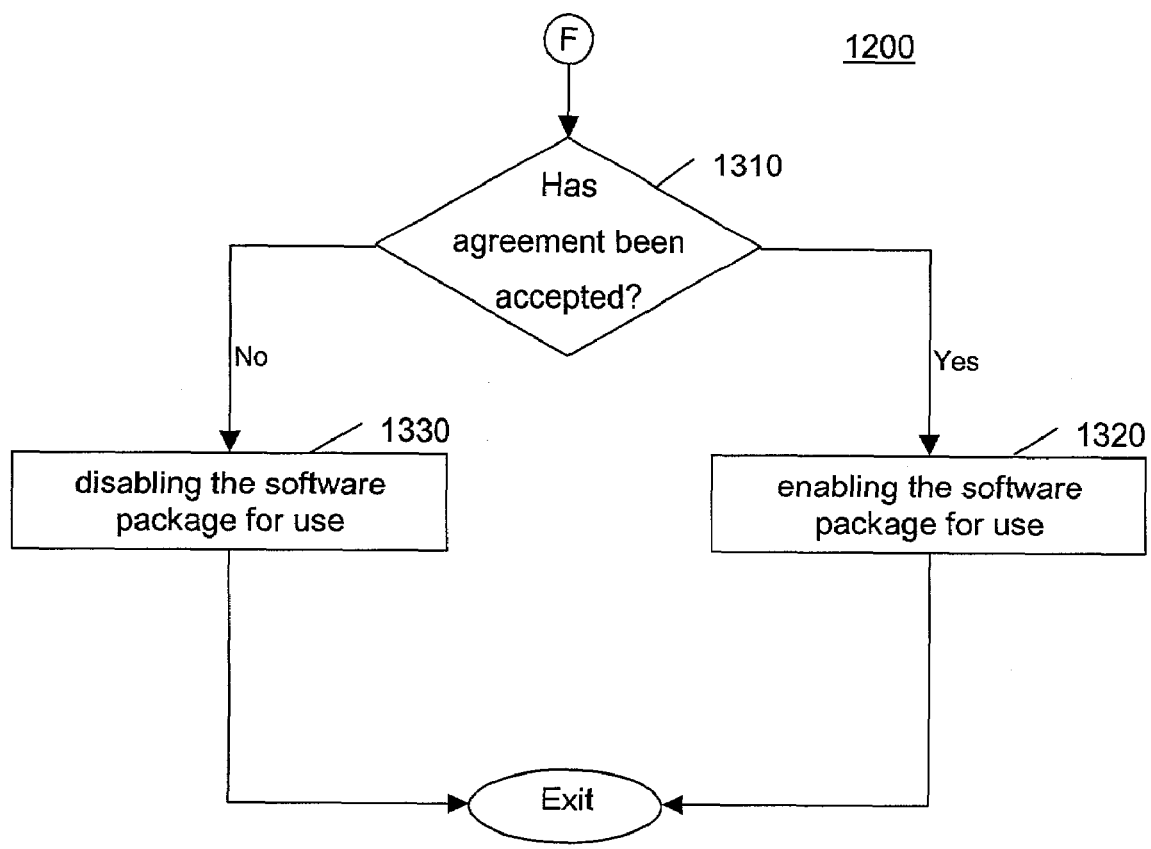

Referring now to FIGS. 12 and 13, one embodiment of aspect C of FIG. 8 is described in more detail. In particular, a method 1200 for handling license agreements for software packages installed in a computer system when initiating a session with the computer system is illustrated. Each software package is identified by a unique package ID and comprises one or more components.

In step 1210, a data structure representing a license agreement database, e.g., data structure 710 shown in FIG. 7, comprising a plurality of package IDs and a plurality of status indications is provided. Each status indication is associated with a specific package ID and represents the status of the license agreement for the software package identified by the specific package ID. The status indicates whether the license agreement has been accepted or declined.

In step 1220, the unique package IDs from the software packages installed in the computer system are extracted. To this end, a package control object as described above with respect to FIG. 7 can be used. The package control object could be created as part of operating system 118 and stored in the main memory 116 of computer system 110 of FIG. 1 and automatically be launched when a user initiates a session. For instance, if one or more software packages have been installed on the computer system by third-parties who are not the end-user, it may be desirable to re-request acceptance of the license agreements of the one or more software packages by the corresponding end-user. Such third-parties include hardware manufacturers who deliver software packages with the computer system, service organizations that have been contracted to manage a customer's system or individuals reselling software. Upon installation of the one or more software packages, the third-parties may setup the package control object to be launched when the end-user initiates a session with the computer system. Initiating a session comprises logging in the computer system in the case of a multi-user computer system; and booting the computer system in the case of a standalone computer system. The launched package control object may then initiate the following steps. However, it should be appreciated that the following steps may alternatively be performed automatically at any time when the user initiates a session with the computer system, so that the creation of a package control object is to be understood as an option to the method described with respect to FIGS. 12 and 13.

Alternatively, the unique package IDs from the software packages installed in the computer system may be extracted from the data structure representing the license agreement database.

In step 1230, the statuses of the license agreements for the software packages identified by the extracted unique package IDs are determined from the data structure representing the license agreement database. In one embodiment, where the status of the license agreement indicates that the corresponding license agreement has been accepted, the software packages are enabled for use by the user. Where the status of the license agreement indicates that the corresponding license agreement has been declined, the following steps are performed. These steps are performed for one software package at a time. For software packages associated with identical license agreements, these steps may, however, be performed once.

In step 1240, the corresponding manifest file for at least one software package, where the status of the license agreement indicates that the corresponding license agreement has been declined, is determined from the plurality of manifest files on the basis of the extracted unique package ID of the at least one software package. In step 1250, the at least one corresponding document file is determined from the plurality of document files on the basis of the determined corresponding manifest file. In step 1260, the one or more text elements of the at least one determined corresponding document file are combined to build the license agreement for the software package.

In step 1270, the license agreement is displayed on a display device of the computer system and a user is prompted in step 1280 to accept or decline the license agreement. In step 1310, the user's response is evaluated to determine, whether he accepts or declines the license agreement.

In response to the user accepting or declining the license agreement, an appropriate action is taken. If the license agreement has been accepted, the process continues in step 1320. In step 1320, the software package is enabled for use by the user. If the license agreement has been declined, the process continues in step 1330. In step 1330, the software package is disabled for use by the user, wherein disabling comprises uninstalling or deactivating the software package.

Furthermore, the data structure representing the license agreement database may indicate a plurality of available software packages for at least one software product, the software package to be enabled or disabled being of the plurality of available software packages. For instance, the at least one software product may be the operating system OS/400 of International Business Machines Corporation of Armonk, N.Y., and the plurality of available software packages may represent, for example, a novice, minimum, standard, customized and complete installation of the operating system. The software package to be enabled or disabled may be a preinstalled software package, for example, the standard installation of the operating system.

FIGS. 14–19 are exemplary display screens illustrating the inventive methods for handling license agreements in a computer system (such as those described with respect to FIGS. 1 and 2), which have been described above with respect to FIGS. 8–13. These display screens represent graphical user interfaces that enable the user to work interactively with the inventive license agreement manager as described above with respect to FIG. 7. However, it should be understood that any display method may be employed that permits a user to interact with the computer system.

Figure 14:
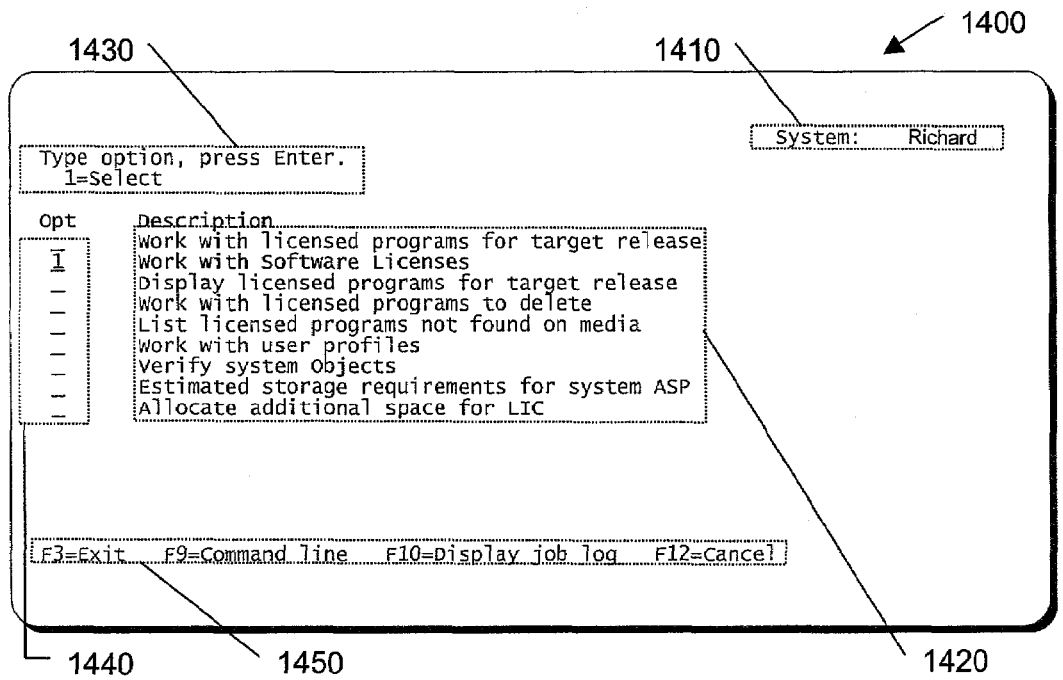
FIGS. 14–19 are exemplary display screens illustrating the inventive methods.

FIG. 14 shows an initial graphical user interface (GUI) 1400 of a license agreement manager for software packages installed or to be installed on the computer system. GUI 1400 comprises an indication 1410 designating, for example, the user associated with the computer system. GUI 1400 further comprises a field 1420 including a list of available choices, each of which may be represented by a corresponding GUI. In field 1430, available commands for the user to select one of the available choices are illustrated. The user can select one of the available choices included in field 1420 by introducing a command into a location in field 1440 that corresponds to the choice to be selected. In the illustrated example, the user introduced a "1" into the location that corresponds to the choice "Work with Software Licenses", which may, by way of example, enable the user to visualize license agreements of software packages installed on the computer systems, which have not yet been accepted. In field 1450, a plurality of additional available commands is illustrated, which are not particularly related to the selection of one of the available choices.

Figure 15:
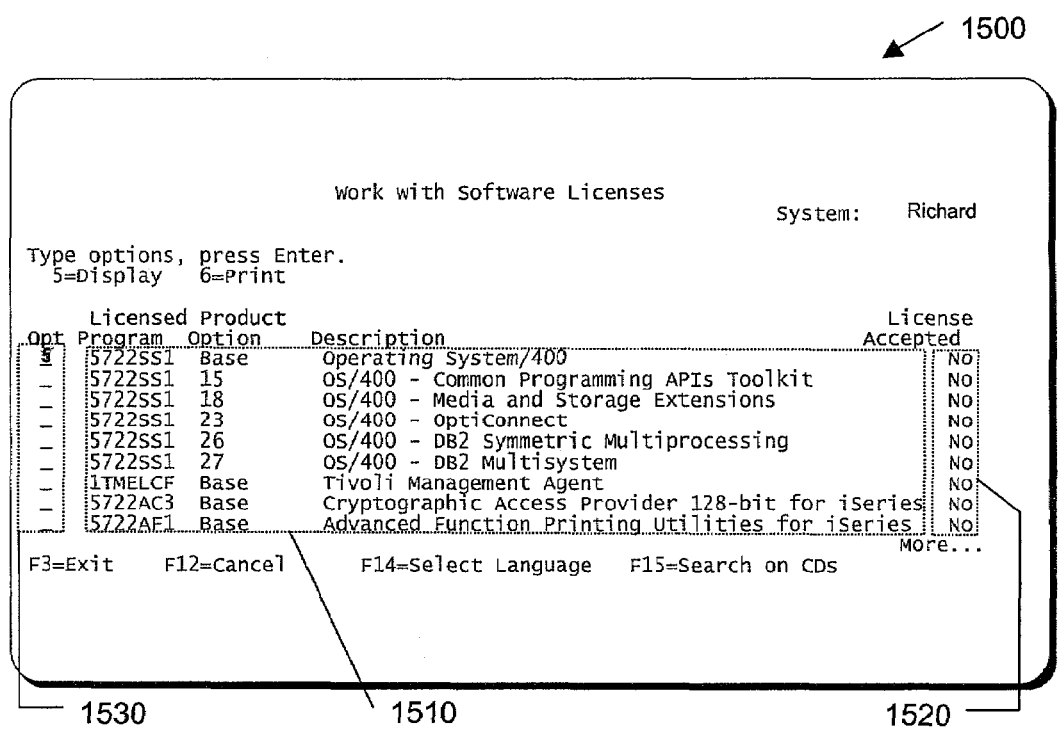

FIG. 15 shows a GUI 1500 that represents the choice "Work with Software Licenses", which has been selected according to FIG. 14. GUI 1500 comprises field 1510 indicating a list of at least a part of the software packages installed or to be installed in the computer system. Field 1520 indicates whether license agreements corresponding to the displayed software packages have been accepted or declined. By introducing a suitable command into a suitable location in field 1530, the user may select a desired software package in order to visualize or print the corresponding license agreement. In the illustrated example, the user introduced a "5" into the location that corresponds to the choice "5722SS1 Base Operating System/400", to visualize the corresponding license agreement.

Figure 16:
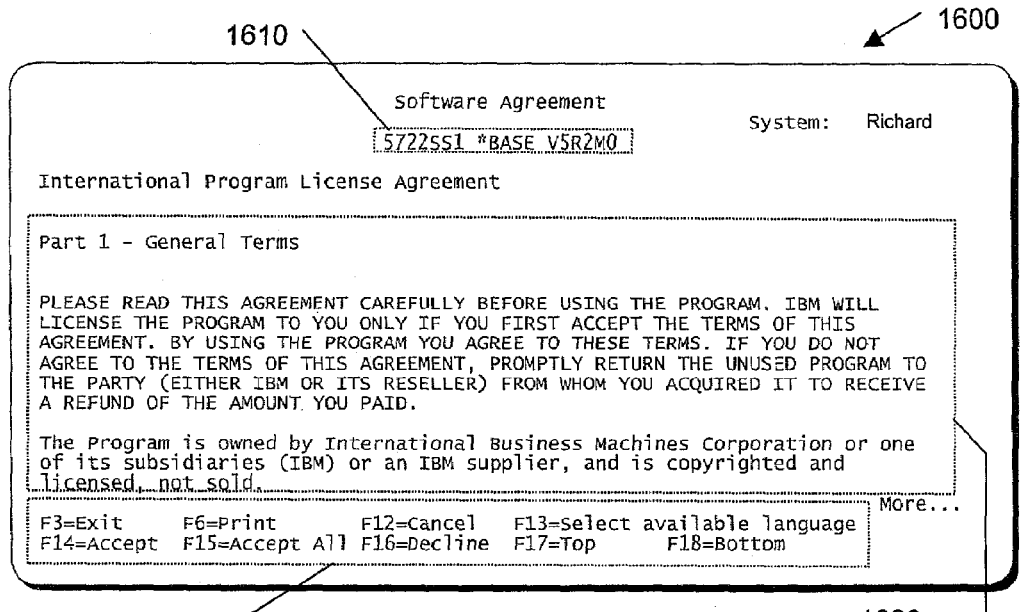

FIG. 16 shows a GUI 1600 that represents the license agreement corresponding to the choice "5722SS1 Base Operating System/400", which has been selected according to FIG. 15. GUI 1600 comprises field 1610, which indicates the unique package ID associated with the selected software package.

As already described above with respect to FIG. 5, the exemplary unique package ID comprises a first part "5722SS1", which preferably identifies a corresponding software product, for example operating system OS/400 of International Business Machines Corporation of Armonk, N.Y. A second part "*Base" indicates preferably a selected option of the software product and, thus, indicates one or more components required to build software package 320. A third part "V5R2M0" indicates preferably a version associated with the selected software package, as for instance, version 5, release 2 etc.

In field 1620, the retrieved text of the corresponding license agreement is displayed. In field 1630, a plurality of available commands is illustrated, which permit the user to accept (F14) or to decline (F16) the displayed license agreement. Furthermore, the user can choose to accept the displayed license agreement once for all software packages associated with this displayed license agreement (F15). Furthermore, the user may choose another language for displaying the license agreement (F13). Language selection is useful in case the user does not understand the language used to display the license agreement.

Figure 17:
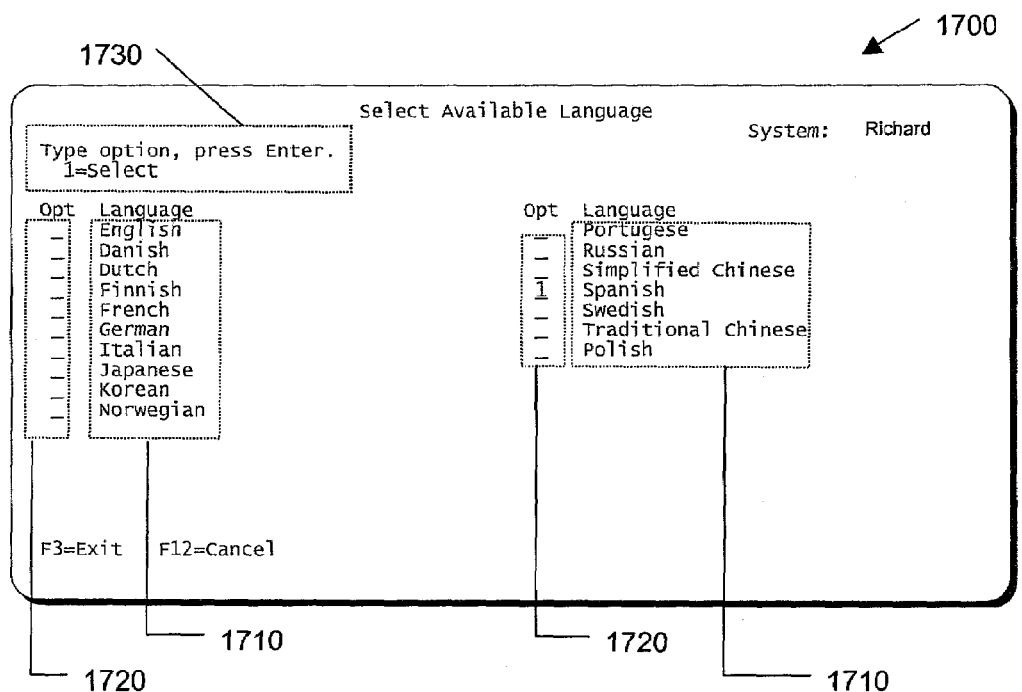

FIG. 17 shows a GUI 1700 that is displayed if the user selects command F13 in the GUI 1600 of FIG. 16 to change the language of the displayed license agreement. GUI 1700 comprises one or more fields 1710 indicating languages that are available for display. Field 1730 indicates how the user may select a desired language of one of fields 1710 by introducing a corresponding command into a suitable location in one of field(s) 1720 that corresponds to the desired language. In the illustrated example, the user introduced a "1" into the location that corresponds to the choice "Spanish", to visualize the license agreement of the selected software package in Spanish language.

Figure 18:
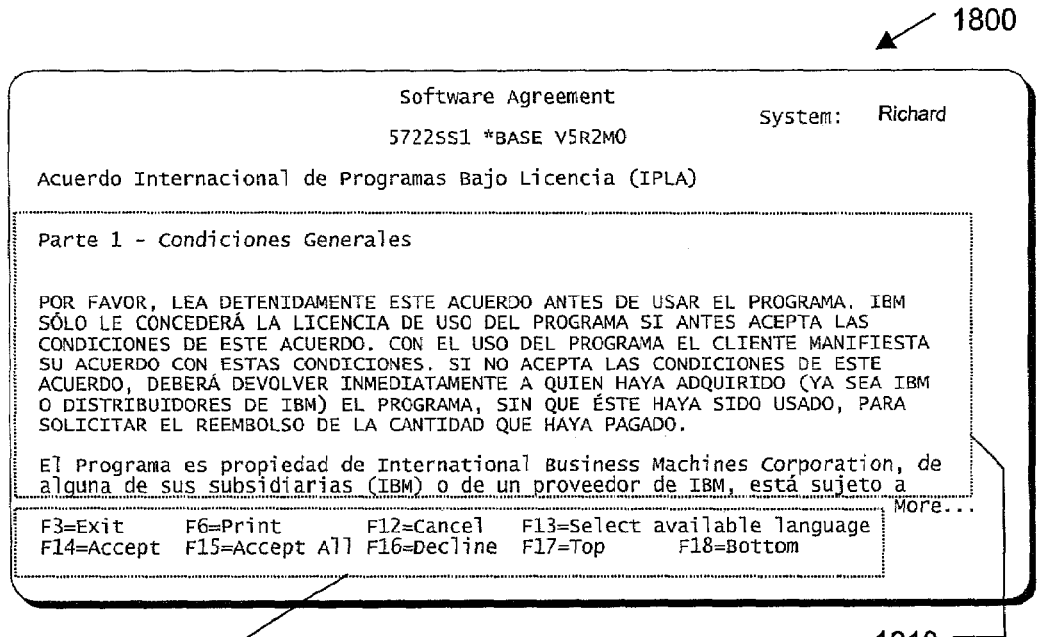

FIG. 18 shows a GUI 1800 that represents the license agreement of FIG. 16 displayed in Spanish language according to the user's choice of FIG. 17. As can be seen from field 1810, the retrieved text of the corresponding license agreement is displayed in Spanish language. However, the plurality of available commands illustrated in field 1820, which permit the user to accept (F14) or to decline (F16) the displayed license agreement, etc., is still in the English language. This may be desirable where the system's language is English and this language should be maintained. Alternatively, the plurality of available commands illustrated in field 1820 may also be displayed in the selected language, i.e., in Spanish.

Figure 19:
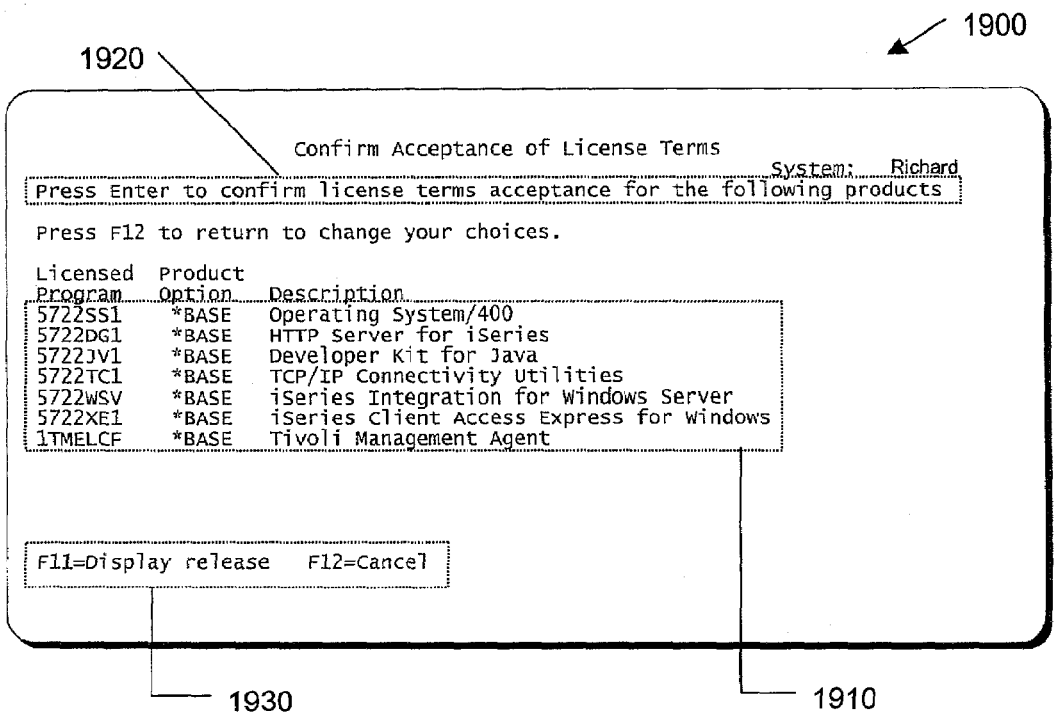

FIG. 19 shows a GUI 1900 that is displayed if the user selects command F15 in the GUI 1600 of FIG. 16 or in the GUI 1800 of FIG. 18 to accept the license agreement once for all software packages associated with this license agreement. GUI 1900 comprises fields 1910 showing a list of all software packages associated, for example, with the license agreement displayed in FIGS. 16 and 18. Field 1920 comprises an indication on how to proceed with the bundled acceptance of the license agreement for all displayed software packages. Furthermore, field 1930 comprises a plurality of additional available commands, which are not particularly related to the bundled acceptance of the license agreement.

The foregoing description applies also to a pre-acceptance mechanism that allows a responsible procurement, legal or management person to review and accept agreements at any time the computer system is up and running, from any workstation attached to the server, and in any language in which the agreement is available and is supported on that workstation. The above described embodiments allow clerical operations staff to handle the install or allows unattended automatic and batch installs and prevents the installation and use of a non-approved and non-accepted software package.

While the foregoing is directed to embodiments of the present invention, other and further embodiments of the invention may be devised without departing from the basic scope thereof, and the scope thereof is determined by the claims that follow.

What is claimed is:

1. A method for handling license agreements for multiple software packages in a computer system, each software package being Identified by a unique package ID and comprising one or more components, the method comprising:

providing a plurality of document files, each document file comprising one or more text elements;

providing a plurality of manifest files, each manifest file indicating at least one corresponding document file of the plurality of document files and comprising a unique package ID designating a corresponding software package;

extracting a specific unique package ID from a specific software package;

determining a corresponding manifest file from the plurality of manifest files on the basis of the extracted unique package ID;

determining the at least one corresponding document file of the plurality of document files on the basis of the determined corresponding manifest file; and building a license agreement for the specific software package by combining the one or more text elements of the at least one determined corresponding document file.

2. The method of claim 1, comprising:
extracting the unique package ID upon installation of the specific software package.

3. The method of claim 1, comprising:
extracting the unique package ID prior to installation of the specific software package.

4. The method of claim 1, comprising:
displaying the license agreement for the specific software package on a display device of the computer system.

5. The method of claim 4, further comprising:
displaying the license agreement within a graphical user interface comprising a prompt for a user to accept or decline the license agreement.

6. The method of claim 1, comprising:
displaying the license agreement for the specific software package on a display device of the computer system;
prompting a user to accept or decline the license agreement; and
storing the user's answer in a data structure in a storage device of the computer system to indicate, whether the license agreement for the specific software package has been accepted or declined.

7. A method for handling a license agreement for a selected software package of a plurality of software packages upon installation of the selected software package in a computer system, each software package of the plurality of software packages being identified by a unique package ID and comprising one or more components, the method comprising:

providing a plurality of document files, each document file comprising one or more text elements;

providing a plurality of manifest files, each manifest file indicating at least one corresponding document file of the plurality of document files and comprising a unique package ID designating one software package of the plurality of software packages;

providing a data structure comprising a plurality of package IDs and a plurality of status indications, each status indication being associated with a specific package ID and representing the status of the license agreement for the software package identified by the specific package ID, the status indicating whether the license agreement has been accepted or declined;

extracting the unique package ID from the selected software package;

determining from the data structure the status of the license agreement for the selected software package identified by the unique package ID; and if the status indicates that the license agreement has been declined:

determining a corresponding manifest file from the plurality of manifest files on the basis of the extracted unique package ID;

determining the at least one corresponding document file of the plurality of document files on the basis of the determined manifest file;

building the license agreement for the selected software package by combining the one or more text elements of the at least one determined document file displaying the license agreement on a display device of the computer system;

prompting a user to accept or decline the license agreement; and in response to the user accepting or declining the license agreement, installing the selected software package only, if the license agreement has been accepted; and if the status indicates that the license agreement has been accepted:

installing the selected software package.

8. The method of claim 7, comprising:
retrieving the at least one determined corresponding document file of the plurality of document files from a storage device of a remote computer system.

9. The method of claim 8, further comprising:
accessing the storage device of the remote computer system via a communications network, comprising the Internet; and
downloading the at least one determined corresponding document file of the plurality of document files via the communications network.

10. The method of claim 7, comprising:
indicating a plurality of available software packages for at least one software product within the data structure, the selected software package being comprised in the plurality of available software packages.

11. A method for handling license agreements for software packages installed in a computer system when initiating a session with the computer system, each software package being identified by a unique package ID and comprising one or more components, the method comprising:
providing a plurality of document files, each document file comprising one or more text elements;
providing a plurality of manifest files, each manifest file indicating at least one corresponding document file of the plurality of document files and comprising a unique package ID designating one software package of the plurality of software packages;
providing a data structure comprising a plurality of package IDs and a plurality of status indications, each status indication being associated with a specific package ID and representing the status of the license agreement for the software package identified by the specific package ID, the status indicating whether the license agreement has been accepted or declined;
extracting the unique package IDs from the software packages installed in the computer system;
determining from the data structure the statuses of the license agreements for the software packages identified by the extracted unique package IDs; and
for at least one software package, where the status of the license agreement indicates that the corresponding license agreement has been declined:
determining the corresponding manifest file from the plurality of manifest files on the basis of the extracted unique package ID of the at least one software package;
determining the at least one corresponding document file of the plurality of document files on the basis of the determined corresponding manifest file;
building the license agreement for the selected software package by combining the one or more text elements of the at least one determined corresponding document file;
displaying the license agreement on a display device of the computer system;
prompting a user to accept or decline the license agreement; and
in response to the user accepting or declining the license agreement,
enabling the software package, if the license agreement has been accepted, for use by the user; and
disabling the software package, if the license agreement has been declined the license agreement, for use.

12. The method of claim 11, comprising:
for at least one software package, where the status of the license agreement indicates that the corresponding license agreement has been accepted:
enabling the software package far use by the user.

13. The method of claim 11, wherein initiating a session comprises at least one of logging in the computer system, the computer system representing a multi-user computer system; and booting the computer system, the computer system representing a standalone computer system.

14. The method of claim 11, wherein the disabling comprises uninstalling the software package.

15. The method of claim 11, comprising:
indicating a plurality of available software packages for at least one software product within the data structure, the software package to be enabled or disabled being comprised in the plurality of available software packages.

16. A data structure in a storage medium, for handling license agreements for multiple software packages in a computer system, each software package being identified by a unique package ID, the data structure comprising a plurality of entries each corresponding to a different one of the multiple software packages, each entry comprising:
an indication of at least one document file, the at least one document file comprising one or more text elements to build a license agreement for a corresponding software package; and
a unique package ID designating the corresponding software package.

17. The data structure of claim 16, wherein the indication of the at least one document file comprises at least one of a path pointing to a file stored in a local storage device of the computer system; a path pointing to a file stored in a removable storage medium; and a link pointing to a file stored in a storage device of a remote computer system.

18. The data structure of claim 16, further comprising:
an indication of one or more components comprised In the corresponding software package.

19. The data structure of claim 18, wherein at least one of the data structure, the at least one document file and the one or more components of the corresponding software package are stored in a removable storage medium.

20. A computer program product on a computer readable storage medium comprising a license agreement manager for handling license agreements for multiple software packages in a computer system, each software package being identified by a unique package ID and comprising one or more components, the license agreement manager comprising:
a first data structure comprising:
at least one document file comprising one or more text elements to build a license agreement;
at least one manifest file, the at least one manifest file comprising:
an indication of at least one document file;
a unique package ID designating a corresponding software package; and
an indication of the one or more components comprised in the corresponding software package; and
a second data structure comprising:
a plurality of package IDs; and
a plurality of status indications, each status indication being associated with a specific package ID and representing the status of the license agreement for the software package identified by the specific package ID, the status
indicating whether the license agreement has been accepted or declined.

21. The computer program product of claim 20, wherein the first data structure is retrieved from a removable storage medium; the removable storage medium comprising at least one of a non-writable storage medium and a writable storage medium; the non-writable storage medium comprising a read-only memory device, the read-only memory device comprising a CD-ROM; and the writable storage medium comprising a floppy disk.

22. The computer program product of claim 20, wherein the second data structure is stored in a storage device of the computer system.

23. A computer-readable medium comprising computer-executable instructions for performing an operation for handling license agreements for multiple software packages in a computer system when run in the computer system, each software package being identified by a unique package ID and comprising one or more components, the operation comprising:
   providing a plurality of document files, each document file comprising one or more text elements;
   providing a plurality of manifest files, each manifest file indicating at least one corresponding document file of the plurality of document files and comprising a unique package ID designating a corresponding software package; and
   extracting a specific unique package ID from a specific software package;
   determining a corresponding manifest file from the plurality of manifest files on the basis of the extracted unique package ID;
   determining the at least one corresponding document file of the plurality of document files on the basis of the determined corresponding manifest file; and
   building the license agreement for the selected software package by combining the one or more text elements of the at least one determined corresponding document file.

24. The computer-readable medium of claim 23, comprising:
   extracting the unique package ID upon installation of the specific software package.

25. The computer-readable medium of claim 23, comprising;
   extracting the unique package ID prior to installation of the specific software package.

26. The computer-readable medium of claim 23, comprising:
   displaying the license agreement for the specific software package on a display device of the computer system.

27. The computer-readable medium of claim 26, further comprising:
   displaying the license agreement within a graphical user interface comprising a prompt for a user to accept or decline the license agreement.

28. The computer-readable medium of claim 23, comprising:
   retrieving at least one of the plurality of document files and the plurality of manifest files from a storage device, the storage device comprising at least one of a local storage device of the computer system and a removable storage medium; the removable storage medium comprising at least one of a non-writable storage medium and a writable storage medium; the non-writable storage medium comprising a read-only memory device, the read-only memory device comprising a CD-ROM; and the writable storage medium comprising a floppy disk.

29. The computer-readable medium of claim 23, comprising:
   removing the at least one determined corresponding document file of the plurality of document files from a storage device of a remote computer system;
   accessing the storage device of the remote computer system via a communications network, comprising the Internet; and
   downloading the at least one determined corresponding document file of the plurality of document files via the communications network.

30. The computer-readable medium of claim 23, comprising:
   displaying the license agreement for the specific software package on a display device of the computer system;
   prompting a user to accept or decline the license agreement; and
   storing the user's answer in a data structure in a storage device of the computer system to Indicate, whether the license agreement for the specific software package has been accepted or declined.

31. A computer-readable medium comprising computer-executable instructions for performing, when run on a computer system, an operation for handling a license agreement for a selected software package of a plurality of software packages upon installation of the selected software package in the computer system, each software package of the plurality of software packages being identified by a unique package ID and comprising one or more components, the operation comprising:
   providing a plurality of document files, each document file comprising one or more text elements;
   providing a plurality of manifest files, each manifest file indicating at least one corresponding document file of the plurality of document files and comprising a unique package ID designating one software package of the plurality of software packages;
   providing a data structure comprising a plurality of package IDs and a plurality of status indications, each status Indication being associated with a specific package ID and representing the status of the license agreement for the software package identified by the specific package ID, the status indicating whether the license agreement has been accepted or declined;
   extracting the unique package ID from the selected software package;
   determining from the data structure the status of the license agreement for the selected software package identified by the unique package ID; and
   when the status indicates that the license agreement has been declined:
      determining a corresponding manifest file from the plurality of manifest files on the basis of the extracted unique package ID;
      determining the at least one corresponding document file of the plurality of document files on the basis of the determined manifest file;
      building the license agreement for the selected software package by combining the one or more text elements of the at least one determined document file to;
   displaying the license agreement on a display device of the computer system;
   prompting a user to accept or decline the license agreement; and
   in response to the user accepting or declining the license agreement,
   installing the selected software package only, if the license agreement has been accepted; and
   when the status indicates that the license agreement has been accepted:
      installing the selected software package.

32. The computer-readable medium of claim 31, comprising:

displaying the license agreement within a graphical user interface comprising the prompt for the user to accept or decline the license agreement.

33. The computer-readable medium of claim 31, comprising:
retrieving at least one of the plurality of document files and the plurality of manifest files from a storage device, the storage device comprising at least one of a local storage device of the computer system and a removable storage medium; the removable storage medium comprising at least one of a non-writable storage medium and a writable storage medium; the non-writable storage medium comprising a read-only memory device, the read-only memory device comprising a CD-ROM; and the writable storage medium comprising a floppy disk.

34. The computer-readable medium of claim 31, comprising:
retrieving the at least one determined corresponding document file of the plurality of document files from a storage device of a remote computer system;
accessing the storage device of the remote computer system via a communications network, comprising the Internet; and
downloading the at least one determined corresponding document file of the plurality of document files via the communications network.

35. The computer-readable medium of claim 31, comprising:
indicating a plurality of available software packages for at least one software product within the data structure, the selected software package being comprised in the plurality of available software packages.

36. A computer-readable medium comprising computer-executable instructions for performing, when run on a computer system, an operation for handling license agreements for software packages installed in a computer system when initiating a session with the computer system, each software package being identified by a unique package ID and comprising one or more components, the operation comprising:
providing a plurality of document files, each document file comprising one or more text elements;
providing a plurality of manifest files, each manifest file indicating at least one corresponding document file of the plurality of document files and comprising a unique package ID designating one software package of the plurality of software packages;
providing a data structure comprising a plurality of package IDs and a plurality of status indications, each status Indication being associated with a specific package ID and representing the status of the license agreement for the software package identified by the specific package ID, the status indicating whether the license agreement has been accepted or declined;
extracting the unique package IDs from the software packages installed in the computer system;
determining from the data structure the statuses of the license agreements for the software packages identified by the extracted unique package IDs; and
for at least one software package, where the status of the license agreement, indicates that the corresponding license agreement has been declined:
determining the corresponding manifest file from the plurality of manifest files on the basis of the extracted unique package ID of the at least one software package;
determining the at least one corresponding document file of the plurality of document files on the basis of the determined corresponding manifest file;
building the license agreement for the selected software package by combining the one or more text elements of the at least one determined corresponding document file;
displaying the license agreement on a display device of the computer system; prompting a user to accept or decline the license agreement; and
in response to the user accepting or declining the license agreement,
enabling the software package, if the license agreement has been accepted, for use by the user; and
disabling the software package, if the license agreement has been declined the license agreement, for use.

37. The computer-readable medium of claim 36, comprising:
for at least one software package, where the status of the license agreement indicates that the corresponding license agreement has been accepted:
enabling the software package for use by the user.

38. The computer-readable medium of claim 36, wherein initiating a session comprises at least one of logging in the computer system, the computer system representing a multi-user computer system; and booting me computer system, the computer system representing a standalone computer system.

39. The computer-readable medium of claim 36, wherein the disabling comprises uninstalling the software package.

40. The computer-readable medium of claim 36, comprising:
displaying the license agreement within a graphical user interface comprising the prompt for the user to accept or decline the license agreement.

41. The computer-readable medium of claim 36, comprising:
retrieving at least one of the plurality of document files and the plurality of manifest files from a storage device, the storage device comprising at least one of a local storage device of the computer system and a removable storage medium; the removable storage medium comprising at least one of a non-writable storage medium and a writable storage medium; the non-writable storage medium comprising a read-only memory device, the read-only memory device comprising a CD-ROM; and the writable storage medium comprising a floppy disk.

42. The computer-readable medium of claim 36, comprising:
retrieving the at least one determined corresponding document file of the plurality of document files from a storage device of a remote computer system;
accessing the storage device of the remote computer system via a communications network, comprising the Internet; and
downloading the at least one determined corresponding document file of the plurality of document files via the communications network.

* * * * *